Patented Sept. 16, 1952

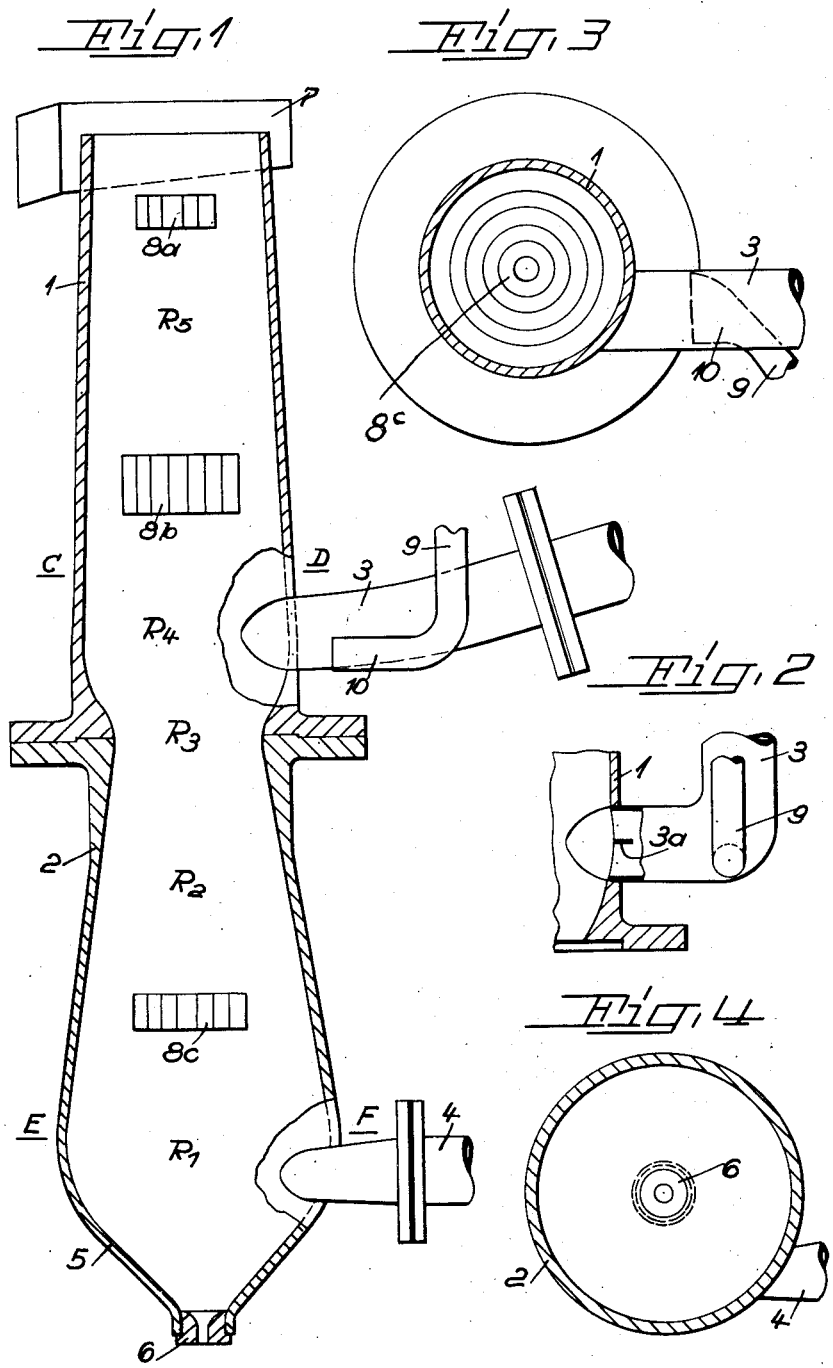

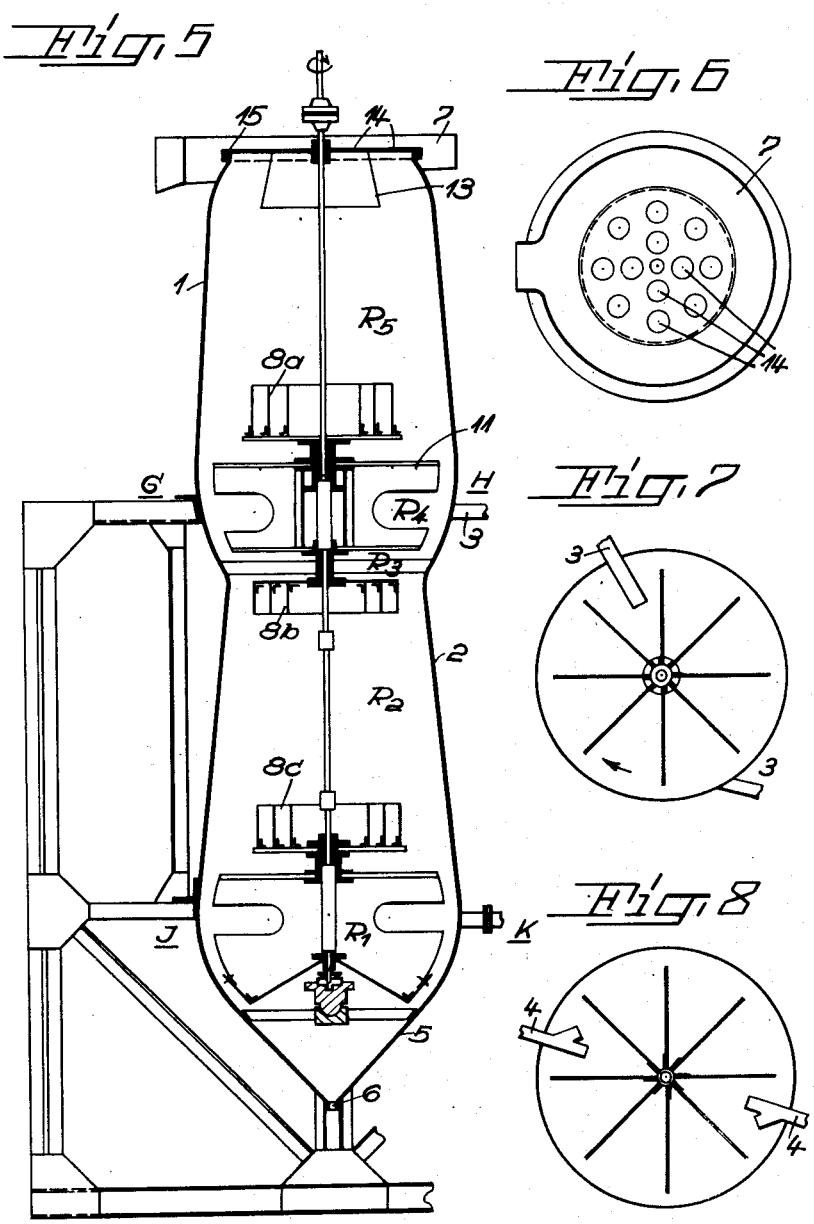

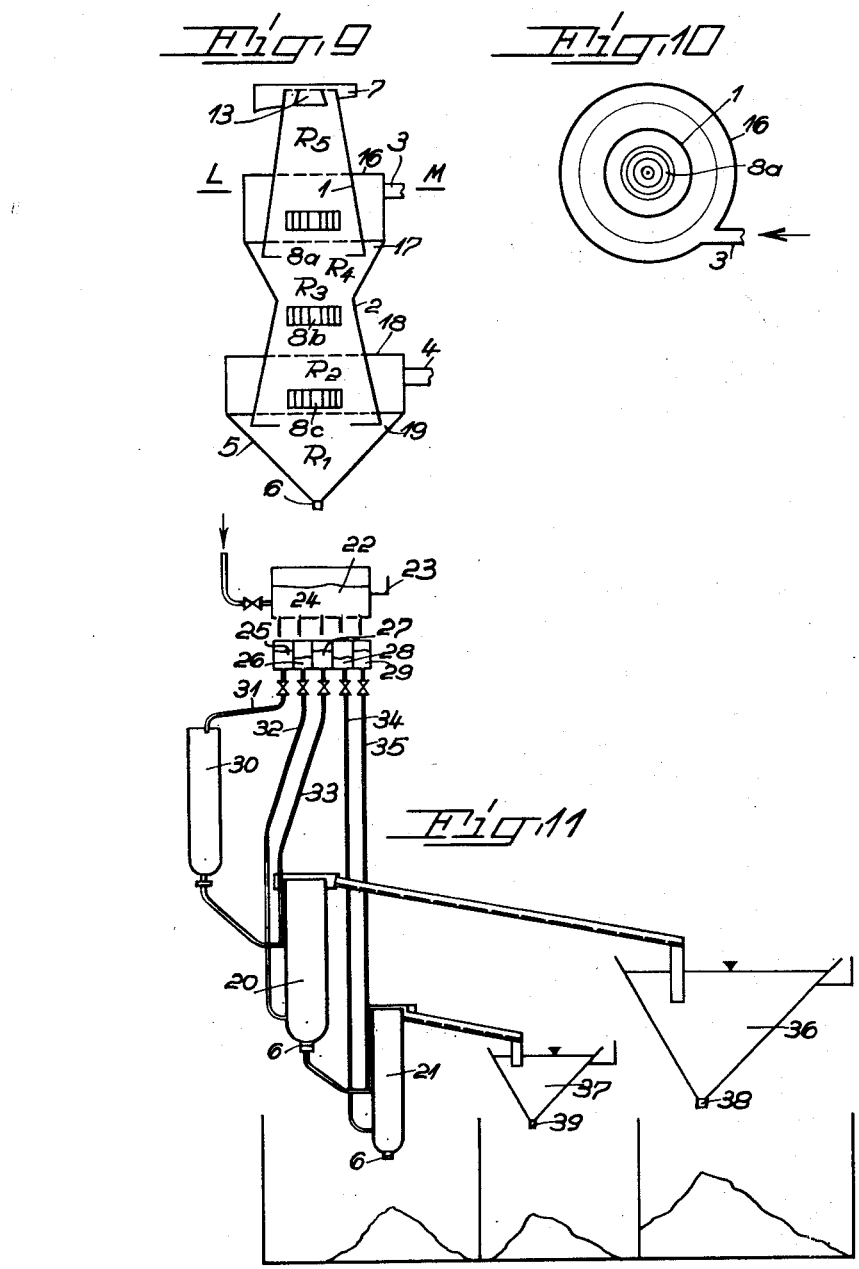

2,610,737

UNITED STATES PATENT OFFICE 2,610,737

PROCESS OF AND APPARATUS FOR STRICTLY LIMITED SEPARATION OF MIXTURES BY THE SPEED OF FALL IN LIQUID MEDIA

Theodor Eder, Vienna, Austria

Application March 18, 1948, Serial No. 15,584
In Austria November 11, 1947

8 Claims. (Cl. 209—159)

According to the known state of the art, the classification by means of screens is considered the most highly selective method which has gained commercial success in sizing grains.

The technical difficulties, however, encountered in the classification by the use of screens grow as the screening meshes become finer, resulting in longer screening time, larger screening surfaces or higher frequencies of vibration.

On the other hand, it is known to size finer materials in rising currents of liquids. (See, e. g., U. S. Patents No. 636,675; 948,513; 1,210,916; and 1,922,489.)

The method of selectively classifying grain mixtures in rising columns of liquids, which has been made available for commercial utilization, is hereafter called "vertical separation," thus distinguishing from separation methods using horizontally moving liquids (e. g. channel sedimentation of kaolin, sand sizing in spitzkastens), which methods are described by reference to their characteristic feature as "horizontal separation methods."

Though vertical separation methods are more highly selective than methods using horizontal separation, the previously proposed methods for vertical separation do not even approach the selectivity of screening.

Another disadvantage of the known methods of vertical separation is the loss of reliability of the separating operation when the feed concentration rises by a small amount only, resulting either in parts of the coarses entering the fines or in clogging up the equipment.

It is the object of this invention to provide a process for vertical separation which practically achieves the same selectivity as that obtained by wet screening methods and, moreover, is suitable for highly concentrated feeds, precludes clogging up of the apparatus and renders the selectivity obtained to a high degree independent from fluctuations in the supply of the feed or of water.

Vertical separation is based on the principle of admitting the granular material to be separated into a rising column of liquid, e. g. at one half of its height, the fines being carried along by the rising current to overflow, the coarses falling against the rising wash water and being removed from the lower part of the apparatus.

When the column of liquid, as has been proposed in many cases, is cylindrical throughout its height, suspended cushions of granular material are formed especially between the washing water and feed inlets if the feed concentration rises by a small amount only. Such cushions considerably reduce the selectivity of the separation and finally cause all coarses to be carried upward, clear water only flowing out through the coarse outlet.

Actually, in a vertical current flowing at all altitudes with the same speed, granular material whose speed of fall equals the vertical speed of the liquid is bound to form very high concentrations.

The formation of suspended cushions of falling grains is to be ascribed primarily to the fact that the zones of increased turbulence, especially the water admission zone in the lower part, are given a higher carrying capacity for particles than would correspond to the average vertical speed prevailing in them.

According to this invention the formation of suspended cushions of grains is prevented thereby that a suspension of the mixture of grains to be separated is admitted to a current of a liquid medium, such as water, which is fed into the separator vessel at a uniform rate and rises with a vertical velocity which increases continuously from the bottom to the top of the separator vessel. In those zones of the separator vessel where the throughput of liquid is constant, the increasing vertical velocity is effected by the cross section of flow having a continuous upward taper, whereas in the zone where the suspension of grains is admitted to the separator vessel, the cross section of flow is increased.

Only the principle of the upwardly increasing vertical velocities, especially the principle of the upward conical taper, overcomes these drawbacks.

It has also been found that the usual methods of admitting the material to be separated lead to the formation of shifting bodies of grains. These agglomerations of small grains fall against the rising liquid as though they were large bodies. The coarses let out at the bottom therefore, contain many fines so that the selectivity is deficient. According to the invention this drawback is overcome in that the suspension of grains, which is admitted to the rising current of liquid horizontally, is agitated and loosened up immediately before its admission by an additional jet of water.

Another essential advantage can be achieved by rotating the rising column of liquid about its vertical axis, either by admitting the liquid tangentially into the separator or, if the vertical velocities are very small, by agitating means. These measures on the one hand reduce the turbulence at the places of admission and on the other hand substantially accelerate the even distribution of grains and water over the whole cross-section of the liquid.

If, according to the invention, concentric annular guides are mounted above the bottom water inlet in the direction of flow, these guides if properly arranged act as brakes for the central portion of the liquid which, not being affected by the friction of the separator walls, tends to move more rapidly than the outer portions, and on the other hand tend to calm down the turbulence of the rising liquid to such an extent that, if the feed is not admitted at too high a rate, the formation of suspended cushions only takes place when the water flows between the water and feed inlets at velocities approaching the speed of fall critical for the separation.

The reliability of operation of a vertical separation method depends not only on the design of the separator vessel but requires that the water and feed be supplied at a constant rate. Because of this dependence of a vertical separator on an accurate and constant regulation of the rates of admission, the rate of water admission is regulated according to the invention in the device described hereafter by maintaining constant the distance from the water level to the outlet into the air and compensating any fluctuations in the supply of water by the overflow of surplus water, the air carried along in the metered water being removed in quieting chambers.

Some embodiments of the invention are illustrated by way of example in the accompanying drawings, in which:

Fig. 1 is a vertical sectional view of an apparatus for vertical elutriation adapted for separation of sand of different sizes of grains, Fig. 2 shows a modified detail, Figs. 3 and 4 are cross-sections taken on the lines C—D and E—F of Fig. 1 respectively, Figs. 5 and 6 are a vertical section and a top view respectively of an apparatus for vertical elutriation with a stirrer, adapted for separation of kaolin and fine sand in great plants, Figs. 7 and 8 are cross-sections taken on the lines G—H and J—K of Fig. 5 respectively, Fig. 9 is a diagrammatic vertical sectional view of a modified construction of an apparatus for vertical elutriation for the aforesaid purpose, Fig. 10 is a cross-section taken on the line L—K of Fig. 9, and Fig. 11 is a diagrammatic view of double-stage plant for vertical elutriation (e. g. for separating small coal from gangue).

Referring to Figs. 1 to 4, the vertical vessel for separation is made of two slightly conically upwardly tapering parts 1 and 2, which are flanged to one another. Approximately in half of the height of the vessel there is a pipe 3 tangentially running into the vessel, adapted for supply of the material to be separated, e. g. a suspension of a mixture of sand of different sizes of grains. Supply of water is effected in the same way by a pipe 4, emptying funnel-shaped into the reduced lower portion 5 of the vessel. The outlet nozzle 6 is exchangeably connected to the end of the funnel, since its section of passage has to be adapted to the size of grains of the coarse material to be cleared off. At the upper end of the vessel there is provided an overflow tank 7 with lateral outlet.

Below the overflow 7 as well as above the supply 3 of the mixture and the supply 4 of water at the bottom, there are provided in the direction of flow concentric annular guide blades $8a$, $8b$ and $8c$, slowing down the extreme flowing in the central part of the vessels 1, 2, and accelerate calming down the eddies.

In order to loosen the conglomerations of grains at the bottom of the pipe 3 for supply of the mixture, a separate water supply 9 is provided near its mouth at the vessel 1, 2 thus preventing from dropping conglomerated grains of different sizes complete in themselves. The pipe 9 empties from the underside into the supply pipe 3, and is provided with a flat enlargement 10 in the moving direction of the material, which enlargement fills up the lower portion of the cross-sectional area of the pipe 3.

Another effective measure for loosening the conglomerations of grains in the supply pipe 3 consists in leading the mixture to be sorted in the vertical direction which is changed into a horizontal one only at a point near to the inlet into the separating vessel 1, the additional water entering the pipe 3 in a tangential direction by the pipe 9 at the bend, (Fig. 2) resulting in thoroughly whirling up the grains. Hereby arising rotation of the liquid in the pipe 3 is capable of being stopped by a suitably fashioned guide blade $3a$ or by several ones.

The operation of the apparatus is as follows:

The mixture of sand to be sorted and inflated by water enters the separating vessel 1, 2 by the pipe 3. The conglomerations of grains forming during the horizontal motion in the pipe 3 are loosened by means of the auxiliary pipe 9 shortly before entering the vessel. The approximately tangential direction of the material entering through the pipe 3 effects rotation of the liquid being present in the space $R_4$. The liquid in the space $R_1$ is rotated by the pure water entering the lower portion of the apparatus by the pipe 4 likewise in a tangential direction. The supply pipes 3 and 4 are dimensioned in accordance with the sizes of the vessel and the outlet nozzle 6 in such a way, that the vertical speed of the liquid in the space $R_4$ amounts to about 1 dm./sec., in higher levels to slightly increased speeds and in lower levels to slightly reduced ones. The finer portions of the sand are taken along by the rising liquid column in the space $R_4$ and finally washed away by the overflow 7. The portion of the grains having for instance a size of more than 0.5 mm. is separated off in the space $R_5$, and continuously moves down into lower levels. The concentric guide blades $8a$ to $8c$ guarantee the untroubled flowing in the space $R_5$, uniform over the entire cross-sectional area. The share of larger size of grains continuously moves down through the space $R_3$ and is freed from the portions of finer grains (less than 0.5 mm. diameter) taken along, by the liquid rising in the space $R_2$.

The portion of the mixture of grains exceeding 0.5 mm. in size drops in the space $R_1$ to the nozzle and is taken along by the outlet.

The superiority of the process of vertical elutriation compared with that of sorting by wet screening becomes fully apparent from the following table of analyses:

*Wet screen sorting: (quantity worked up 4 kg. square metre and minute)*

| Size of grains | Shares | |
| --- | --- | --- |
| | glass maker's sand | waste sand |
| | Percent | Percent |
| less than 0.5 mm | 91.3 | 29.2 |
| 0.5–1 mm | 7.5 | |
| 1 –2 mm | 1.2 | 71.8 |
| more than 2 mm | 0.1 | |

*Vertical elutriation: (quantity worked up 20kg./100 minute-liters water)*

| Size of grains | Shares | |
| --- | --- | --- |
| | glass maker's sand | waste sand |
| | Percent | Percent |
| less than 0.5 mm | 98.4 | 17.8 |
| 0.5–1 mm | 1.55 | |
| 1 –2 mm | 0.05 | 82.2 |
| more than 2 mm | 0 | |

Although the prime cost of an apparatus for vertical elutriation is one tenth of that for wet screen separation the exactness of sorting was possible to be improved to such an extent, that the maximum sizes of grains kept limited to about 0.5 mm. (compared with about 1 mm. according to the known process), whereas the losses were reduced from 29% to 18%.

The great importance of this result especially for manufacture of glass becomes evident from the fact, that the space of time required for melting in the melting kettle depends on the diameter of the largest grains, almost independently from the proportion of the same, but not on the average diameter of the sand for glass making.

Another important line of using the vertical elutriation is the production of kaolin. In most of the application of kaolin, the existence of coarse components, which are caught by a screen of 10,000 meshes/square cm. (i. e., a diameter of grain exceeding 0.06 mm.) is undesirable.

It is not possible to exactly separate a mixture of kaolin and fine sand as existing in the working up of raw kaolin, by means of the usual methods of horizontal elutriation (continuous or discontinuous elutriation in channels, basins, etc.) or of centrifuges provided with nozzles. Figs. 5 to 8 and Figs. 9 and 10 of the drawings illustrate by way of example wholesale plants for that purpose, in which figures like figures of reference indicate the parts corresponding with those of Figs. 1 to 4.

The mixture of kaolin and fine sand to be sorted is supplied in form of a suspension to the periphery and the middle portion of the space $R_4$ by means of pipes 3.

A stirrer very slowly revolving having eight blades 11 is arranged in the axis of the vessel, and effects the uniform distribution of the mixture over the whole cross-sectional area of the liquid.

Pure water is supplied to the lower portion of the vessel by means of pipes 4 having their mouths at different distances from the axis respectively, the water being distributed by eight stirrer blades 11 (Figs. 5 to 8).

It is also possible to supply the material to be worked up through the axle of the stirrer formed into a hollow axle, causing the material to discharge from the stirrer blades at points having different distances from the axis respectively, thus possibly reducing turbulences in the space $R_4$.

The vertical components of the speeds of the liquid in the space $R_3$ slightly exceed those of the space $R_2$. Their amounts depend on the specific weights of the raw material to be worked up, and of its admixed substances, as well as on the average shape of the particles. (In an individual case the vertical components in the space $R_4$ amounted to 3 mm./sec.)

The kaolin (that is the particles having size of grain of less than 0.06 mm.) is freed from the coarse grains in the space $R_5$, and is removed by the overflow through the tank 7. A conical guide blade 13 and apertures 14 of the cover 15 prevent non-uniform flowing from advancing into the space $R_3$, which non-uniform flowing might be caused by portions of faster flowing of the overflow.

The slick (particles of more than 0.06 mm. diameter) continuously moves down the space $R_2$, where it is freed from the remaining particles of kaolin, and finally continuously escapes through the outlet nozzle 6 in form of a concentrated suspension.

According to the simplified embodiment as shown in Figs. 9 and 10, the water suspended mixture of kaolin and sand to be sorted is supplied by the pipe 3 to a wide annular jacket 16 surrounding the separating vessel 1, 2, which jacket being high enough as to enable the dropping particles to be uniformly distributed over the whole peripheral area of the inlet slot 17 prior to entering the vessel 1. In the same way the washing water is supplied by pipes 4 to the annular jacket 18 with the discharging slot 19.

Tests have proved that with a single vertical elutriation (the constructional height of the separating vessel was five times the diameter of the cross-section of the liquid) considerably better results have been obtained as by a threefold horizontal elutriation, as the following figures show:

| 3-fold horizontal elutriation | single vertical elutriation |
| --- | --- |
| kaolins<br>1st stage, 0–3% coarse shares, more than 0.06 mm.<br>2nd stage, 1–4% coarse shares, more than 0.06 mm.<br>3rd stage, 2–5% coarse shares, more than 0.06 mm. | kaolin<br>0–1% coarse shares, more than 0.06 mm. |
| slick<br>40–50% contents of kaolin (shares of grains with a size less than 0.06 mm.) | slick<br>10–20% contents of kaolin (shares of grains with a size less than 0.06 mm.) |

In the two-stage vertical elutriation plant as diagrammatically shown in Fig. 11, separating in the vessel 20 is executed according to a small critical speed of fall, whereas the coarse grained discharged material is anew sorted in another separating vessel 21 according to a greater speed of fall, resulting in a reduction of the constructional height of the plant.

The water tank 22 is provided with a permanently running overflow 23, thus keeping the water in the tank at the same level. The water runs freely by nozzles 24 of a certain size into the intermediate vessels 25 to 29, thus ensuring the supply to the same keeping constant. The air bubble taken along are enabled to rise in those intermediate vessels 25 to 29 as the speed of the liquid moving down in the said vessels is a slow one (less than 10 cm./sec.), thus being prevented from producing turbulences in the vessels 20, 21. Changing resistances within the same, it is true, effect changing the levels in the intermediate vessels 25 to 29, but they have no influence to the quantities of supply, as the water freely crosses the interposed space of air. The mixture of grains to be sorted is supplied to an auxiliary vessel 30 provided with a water supply 31 and having its upper portion wide enough as to enable great air bubbles. The conduits 32 and 34 supply water to the bottom of the separating vessels 20 and 21 respectively, and the conduits 33 and 35 the water for diluting the mixture.

In the overflows of the separating vessels 20 and 21 there is only a slight concentration of grains. The concentrated portion is separated from the superfluous water preferably running off the level of the funnels 36, 37, and is discharged by the nozzles 38, 39. The concentration of the discharged material may be automatically adjusted by a float gauge (not shown in the drawings), the conical lower part of which preferably operating within the outlet nozzle and is raised in case of increasing of the concentration within the funnel, thus enlarging the outlet cross-section of the nozzle.

In case great constructional heights are available, separation may be carried out first by the greatest speed of fall, and the fine grained share may be anew subjected to a separating process by a reduced speed of fall, the overflow from the concentrated masses in the funnels may be used as washing liquid in the subsequent separation.

The usual sedimentation process for separating materials of different densities such as coal and gangue, fails in case of fine grained coal.

Using vertical elutriation, however, succeeds in separation of even finer grained coal particles from gangue, which separation otherwise is possible to be obtained but by flotation.

For the design of a vertical elutriation it is necessary first of all to ascertain the speeds of fall of the concerned coal and the concerned gangue by different sizes of grains in a water column. If the greatest size of grains, for which vertical elutriation is still considered to be economical, is assumed to be 8 mm., the screen of the next fineness, determining the lower limit of the first fraction of screened material for vertical elutriation, is found out by the condition, that the speed of fall of the grains of coal with a size of 8 mm. has to be smaller than or at most equal to that of the concerned sizes of grains of the gangue.

The following values have been found in a special case:

| Size of grains, mm. | Speed of fall, coal | Speed of fall, gangue in still water |
| --- | --- | --- |
| | cm./sec. | cm./sec. |
| 8 | 10–15 | |
| 2 | 4–6 | 20–35 |
| 0.3 | 0.5–1.5 | 8–12 |
| 0.1 | | 2–3 |

After dry screening by a screen of 8 mm., 2 mm., 0.3 mm. size of mesh respectively, the coarsest share (8–8) mm. is vertical elutriated with a speed of 12 cm./sec., the middle one (2–0.3 mm.) with that of 5 cm./sec., and finest one (less than 0.3 mm.) with 1.2 cm./sec.

In vertical elutriation of the coarsest share (grains up to 8 mm.) either an outlet nozzle of at least 40 mm. internal diameter is required, the water consumption of which appears economic only in case of great quantities to be worked up, or the coarse grains are removed in a mechanical way, for instance by means of a bucket elevator.

The vertical elutriations of the two first said fractions result in a complete separation of the coal from the gangue, and in the third one the discharged coal still contains those usually slight additions of gangue, the size of grains of which being less than 0.1 mm.

What I claim is:

1. A process for the selective classification of grains by their different speeds of fall in a column of rising liquid, which process comprises admitting a separating liquid to the lower part of a separator vessel to form a column of rising liquid, introducing into a liquid suspension of the grains to be classified a liquid jet for agitating and loosening up said liquid suspension, directly admitting said liquid suspension in a loosened-up condition to the column of liquid approximately at the center of the height thereof immediately after the injection of the liquid jet into said suspension, controlling the admission to said liquid column, of said separating liquid, of the liquid for the suspension of grains, and of the liquid for said jet, for constant relative rates and accelerating gradually and practically continuously the vertical velocity of the liquid in the vessel from the point of admission of the separating liquid to the top of the column.

2. A process as claimed in claim 1, which comprises admitting the separating liquid, the liquid for the suspension of grains, and the liquid for said jet, out of a common liquid supply at a constant rate in a free jet into a deaerating vessel for each of said liquids, and feeding each of said liquids from its deaerating vessel to its point of admission adjacent to the separator vessel.

3. A process for the selective classification of grains by their different speeds of fall in a column of rising liquid, which comprises admitting a separating liquid to the lower part of a separator vessel to form a column of rising liquid, rotating said column of liquid about its vertical axis, introducing into a liquid suspension of the grains to be classified a liquid jet for agitating and loosening up said liquid suspension, admitting directly to said liquid column approximately at the center of the height thereof tangentially in the sense of rotation of the liquid column said liquid suspension in a loosened-up condition immediately after the introduction of said liquid jet into said suspension, controlling the admission to said liquid column, of said separating liquid, of the liquid for the suspension of grains, and of the liquid for said jet, for constant relative rates and accelerating gradually and practically continuously the vertical velocity of the liquid in the vessel from the point of admission of the separating liquid to the top of the column.

4. A process as set forth in claim 3, comprising braking the flow of liquid in a core portion of the column of rising liquid which core portion is not subjected to liquid friction at the separator walls, in order to reduce a high velocity of flow of said core portion relative to other portions of the column and to produce a current the speed of which is equalized throughout the cross section of flow.

5. Apparatus for selectively classifying grains by their different speeds of fall in a rising column of liquid, comprising a vertical separator vessel composed of two superimposed parts, each part having an upwardly widening bottom portion and an upper portion having a continuous upward taper from its lower end, where its adjoins said bottom portion, at least one liquid supply conduit tangentially connected to the lower part of the separator vessel at the level of the largest cross section thereof, at least one supply conduit for a liquid suspension of grains one end of which opens tangentially into the upper part of the separator vessel at the largest cross section thereof, and a conduit for additional liquid for agitating said suspension of grains, said conduit for additional liquid being connected to said supply conduit for a liquid suspension of grains adjacent to the end of the latter conduit opening into the separator vessel.

6. Apparatus as set forth in claim 5, comprising means consisting of concentric sheet metal rings coaxial with the separator vessel and arranged in a space adapted to accommodate a core portion of the liquid column spaced from the walls of the separator vessel, the height of said rings exceeding the free radial distance between adjacent rings, at least one of said guide means being provided between the level where the liquid supply conduit is connected to the separator and the level where the conduit for the liquid suspension of grains is connected to the separator vessel, and at least one of said guide means being provided above the level where the conduit for the liquid suspension of grains is connected to the separator vessel.

7. Apparatus as set forth in claim 5, in which said supply conduit for the suspension of grains comprises at least one pipe elbow opening horizontally into the separator vessel and said conduit for additional liquid comprises at least one pipe opening tangentially at the bottom of said elbow and normal to the direction of flow of the suspension of grains in said elbow.

8. Apparatus as set forth in claim 5, which comprises an elevated tank, an overflow adapted to flow continuously, to maintain a constant level of liquid in said tank, outlet nozzles in said tank, said outlet nozzles in number and liquid supply rate corresponding to the conduits for the separating liquid, the liquid of the suspension of grains, and the additional liquid, a deaerating tank arranged below each outlet nozzle, said outlet nozzle being adapted to introduce a free jet of liquid into said deaerating tank, and each of said conduits leading from the respective deaerating tank to the respective point of admission adjacent to the separator vessel.

THEODOR EDER.

REFERENCES CITED

The following references are of record in the file of this patent:

UNITED STATES PATENTS

| Number | Name | Date |
|---|---|---|
| 528,803 | Ramsay | Nov. 6, 1894 |
| 636,675 | Latimer | Nov. 7, 1899 |
| 948,513 | Lenders | Feb. 8, 1910 |
| 1,035,864 | Dallemagne | Aug. 20, 1912 |
| 1,143,587 | Marsden | June 15, 1915 |
| 1,205,673 | Shahan | Nov. 21, 1916 |
| 1,210,916 | Draper | Jan. 2, 1917 |
| 1,351,234 | Draper | Aug. 31, 1920 |
| 1,449,603 | Hokanson | Mar. 27, 1923 |
| 1,516,204 | Olsen | Nov. 18, 1924 |
| 1,705,351 | Andrews | Mar. 12, 1929 |
| 1,841,444 | Hosking | Jan. 19, 1932 |
| 1,922,489 | Mercier | Aug. 15, 1933 |
| 1,989,937 | Lessing | Feb. 5, 1935 |
| 2,091,514 | Meston | Aug. 31, 1937 |
| 2,346,005 | Bryson | Apr. 4, 1944 |

FOREIGN PATENTS

| Number | Country | Date |
|---|---|---|
| 171,267 | Great Britain | Nov. 17, 1921 |